INVENTOR.
GEORGE L. SWIGERT
BY Charles M. Hogan
Eugene C. Goodale
HIS ATTORNEYS

INVENTOR.
GEORGE L. SWIGERT

BY Charles M. Hogan
Eugene C. Goodale

HIS ATTORNEYS

FIG-7
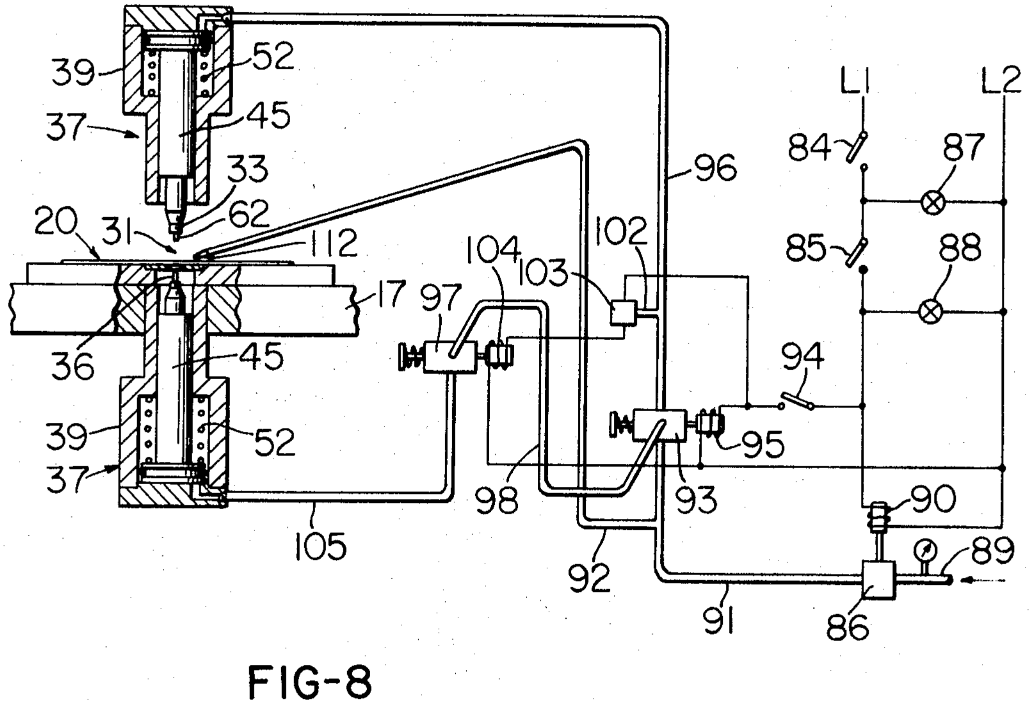
FIG-8
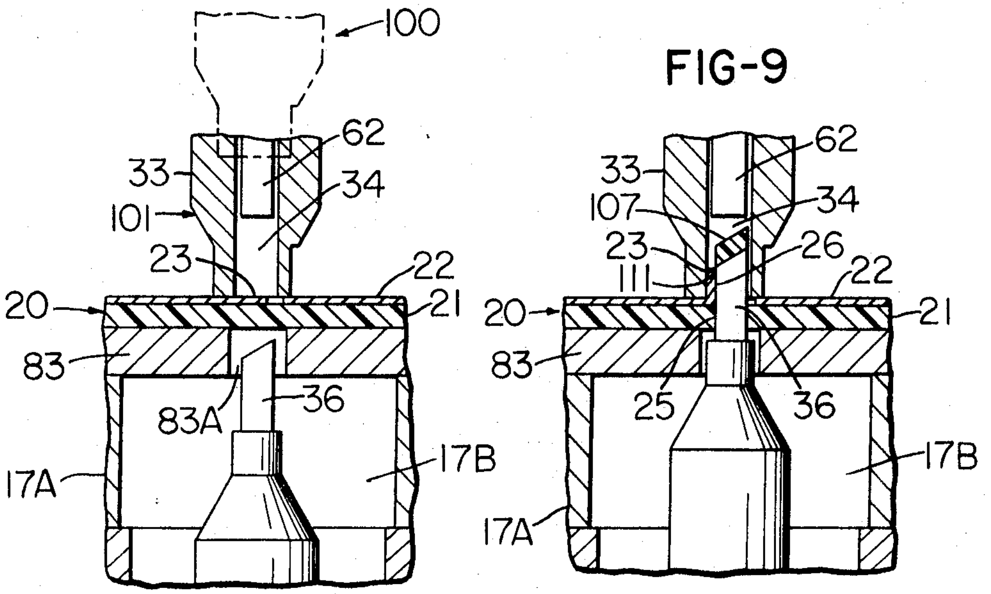
FIG-8, FIG-9
INVENTOR.
GEORGE L. SWIGERT
BY Charles M. Hogan
Eugene C. Goodale
HIS ATTORNEYS United States Patent Office 3,625,038

Patented Dec. 7, 1971

3,625,038
APPARATUS FOR PROVIDING ACCESSIBLE TAB MEANS IN A SHEET-LIKE CONSTRUCTION

George L. Swigert, Maineville, Ohio, assignor to Avco Corporation, Cincinnati, Ohio Filed Dec. 10, 1969, Ser. No. 883,821
Int. Cl. B21d 28/10, 31/02, 37/00
U.S. Cl. 72—20 6 Claims

ABSTRACT OF THE DISCLOSURE

An apparatus is provided which has a die and a cooperating punch which are controlled with optimum efficiency to expose tabs provided as an integral part of a metallic layer comprising an associated laminate and bend such tabs transverse their original positions for easy access thereto. During the bending action the punch also cleans that surface of each tab which was previously bonded to a portion of a substrate which comprises the laminate and adjoins the metallic layer.

CROSS-REFERENCE TO RELATED APPLICATION

This application is related to U.S. Pat. 3,532,802, issued Oct. 6, 1970, to W. E. J. Spall, and of common assignment with the present application.

BACKGROUND OF THE INVENTION

In the manufacture of electronic printed circuit boards, of the character described in the application cross-referenced above, a sheet of electrically conductive metallic material is laminated to an associated substrate made of a suitable electrical insulating material, such as a glass epoxy substrate, and the metallic sheet has metal tabs defined therein as an integral part thereof. To keep the total cost of this type of circuit board to a minimum, it is desirable that an apparatus be provided which exposes and bends selected tabs with optimum efficiency, so as to provide easy access thereto.

SUMMARY

This invention provides an improved apparatus used in making electronic printed circuit boards each comprised of a sheet of electrically conductive metallic material having individual metallic tabs provided as an integral part thereof and such metallic sheet is laminated to an associated substrate made of an epoxy-based electrical insulating material. The apparatus has a die and a cooperating punch which are controlled with optimum efficiency to expose selected tabs of each circuit board by punching associated openings in those portions of the substrate arranged therebeneath and bending such tabs transverse their original positions for easy access thereto. During the bending of each tab, the punch also simultaneously cleans that surface of each tab which was previously bonded to a portion of the substrate to enable easy welding of an associated electrical lead thereto.

Other details, uses, and advantages of this invention will become apparent as the following description of the exemplary embodiment thereof presented in the accompanying drawings proceeds.

BRIEF DESCRIPTION OF THE DRAWINGS

The accompanying drawing show a present preferred embodiment of this invention, in which:

FIG. 7 is a view of the die and cooperating punch comprising the apparatus of FIG. 1 and their associated actuating means; with certain parts shown schematically, others shown in elevation, and still others shown in cross section;

FIG. 8 is an enlarged fragmentary cross-sectional view particularly illustrating a die holding an associated laminate, which is used to define a printed circuit board, clamped against the worktable of the apparatus of FIG. 1 prior to shearing or punching an opening in the substrate of such laminate and bending the adjoining tab within a die opening of the die; and FIG. 9 is a view similar to FIG. 8 after shearing of the substrate and showing the tab and punch within the die opening.

DESCRIPTION OF ILLUSTRATED EMBODIMENT

Figure 1:
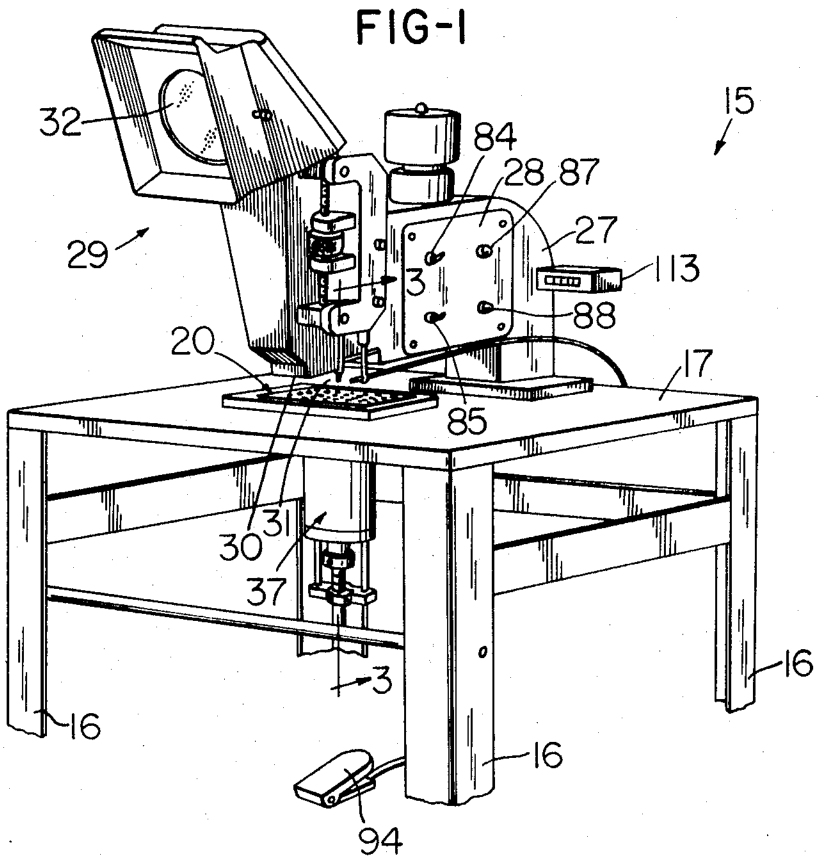
FIG. 1 is a perspective view with parts broken away of one exemplary embodiment of the apparatus of this invention.
Figure 2:
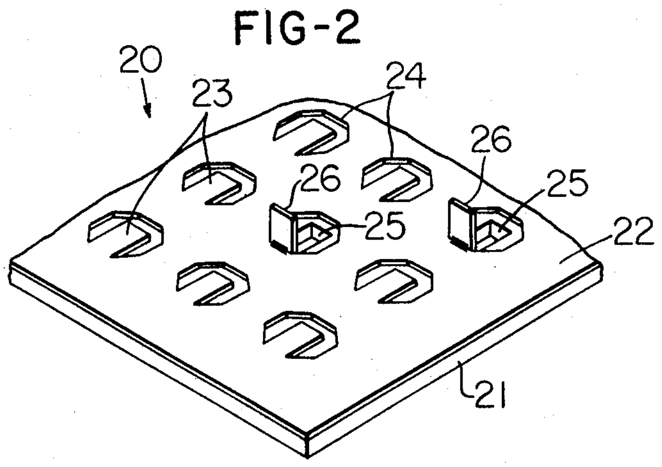
FIG. 2 is a fragmentary perspective view of an electronic printed circuit board processed by the apparatus of FIG. 1.

Reference is now made to FIG. 1 of the drawings which illustrates one exemplary embodiment of the apparatus of this invention which is designated generally by the reference numeral 15. The apparatus 15 has a plurality of vertical legs 16 which support supporting means shown as a worktable 17 which is adapted to support an electronic printed circuit module which is in the form of a laminate or sheet-like construction 20 which is processed through the apparatus 15 to define a printed circuit board which for simplicity is also designated by the reference numeral 20, see FIG. 2, and such circuit board is ready to have other electrical components connected thereto in accordance with well known techniques.

The laminate or module 20 is in the form of a multiple-layer construction comprised of a substrate 21 made of a suitable electrical insulating material, such as a material having an epoxy resin base, and in this example the substrate 21 is a glass epoxy material. The laminate 20 has a metallic sheet or layer 22 provided with integral tab means or tabs 23 which extend within roughly octagonal openings 24 in such layer and the entire laminate or module may, if desired, be made essentially as described in the aforementioned U.S. Pat. 3,532,802.

The apparatus 15 is of simple and economical construction and is easily operated by comparatively unskilled operators with minimum training. The apparatus 15 is used to form an opening 25 in the substrate 21 beneath each selected tab 23 and thereby expose substantially the entire surface area of such tab. Simultaneously with the forming of an opening beneath each selected tab, the tab is bent transverse its original position and that surface thereof, i.e., its inside surface 26, previously bonded to the substrate is cleaned.

The apparatus 15 also has a substantially L-shaped supporting column 27 which is suitably fixed adjacent a side edge portion of the worktable 17. A control panel 28 is supported on the column 27 and has a plurality of switches and indicating lights which are utilized to control the operation of apparatus 15 and in a manner to be described in detail subsequently.

The apparatus 15 has a device for precisely positioning the laminate 20 on the worktable 17 and in this example of the invention such device is in the form of an optical positioner 29 of known construction which has a lower portion 30 thereof arranged adjacent a work station 31 so that a portion of a workpiece such as laminate 20 arranged beneath the lower portion 30 of the optical positioner 29 is magnified and viewed on a screen 32. The positioner 29 enables an operator to precisely position such laminate with respect to reference points on the screen 32 and thereby precisely position the laminate on the worktable so that a tab 23 to be exposed and bent is aligned between a die 33 which has a die opening 34 and a cooperating punch 36 which is adapted to be received within such die opening 34. The operation of the die 33 and punch 36 of apparatus 15 and of their associated components will be described in detail subsequently.

The apparatus 15 has suitable means for relatively moving its punch 36 and die 33 so that upon relatively moving the punch and die together an opening 25 is pierced or punched in the laminate and an associated tab 23 is bent within the die opening 34 of die 33. Upon relatively moving the punch 36 and die 33 apart the bent tab 23 remains bent transverse, i.e., perpendicular to, its original position. The moving means for the die 33 and punch 36 comprise a pair of actuators in the form of air cylinders and because such air cylinders are very similar in construction and operation they will each be given the same general reference numeral 37 and corresponding component portions thereof will be given the same reference numerals and the construction and operation of such component portions being described in detail only once. It will also be noted that each air cylinder 37 serves to both support and move the die 33 or punch 36 associated therewith.

Figures 3, 4, 5, 6:
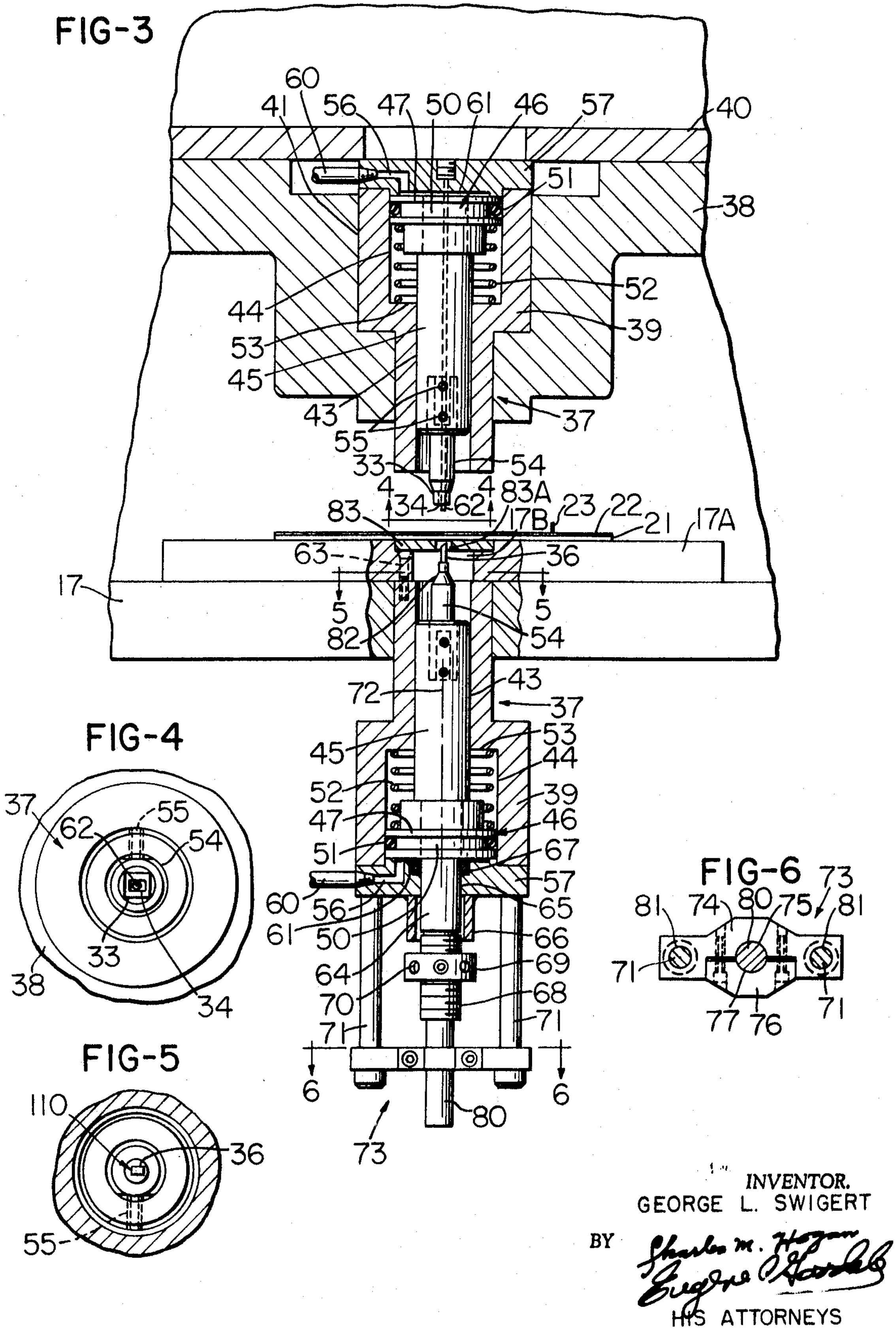
FIG. 3 is an enlarged view with parts in cross section and parts broken away taken essentially on the line 3—3 of FIG. 1.
FIG. 4 is a view with parts broken away taken essentially on the line 4—4 of FIG. 3.
FIG. 5 is a fragmentary cross-sectional view taken essentially on the line 5—5 of FIG. 3.
FIG. 6 is a view with parts in cross section taken on the line 6—6 of FIG. 3.

As seen particularly in FIG. 3 of the drawings the upper actuator or air cylinder 37 which supports and moves the die 33 is suitably fixed to a structure 38 which is in turn fixed to a portion 40 of the L-shaped column 27. Each cylinder 37 has an outer housing 39 comprised of a large diameter portion and an adjoining smaller diameter portion. The upper cylinder is supported by placing the housing 39 thereof in a suitable counterbored opening 41 in the structure 38 and suitably fixing such housing in position; however, the lower cylinder 37 associated with the punch 36 is supported in a different manner and as will be described later.

Each housing 39 has a bore 43 and an adjoining counterbore 44 provided therein. A cylindrical member 45 is supported for vertical sliding or telescoping movements within the cylindrical bore 43 and has a piston assembly 46 fixed at one end thereof. The piston assembly 46 comprises a piston head 47 which has a circumferential groove 50 which carries a sealing O-ring 51. A compression spring 52 is provided and acts between an annular surface 53 in the housing 39, which defines the bottom of the outer periphery of the counterbore 44 and the piston head 47 to urge the head 47 and hence member 45 to a retracted position.

The die 33 is suitably fixed to an associated supporting member 54 which is in turn attached to member 45 by a plurality of threaded bolts 55. Thus, it is seen that the die 33 is supported and moved vertically upwardly and downwardly upon moving the telescoping member 45 in a corresponding manner.

Each air cylinder 37 has a passage 56 provided in a head portion or end plates 57 thereof and an air line 60 is connected to passage 56 and provides high pressure air to cylinder 37. Thus, upon supplying air through line 60 into a cavity 61 between plate 57 and head 47 the spring 52 is over-ridden and member 45 and its associated die 33 or punch 36 is telescoped toward worktable 17.

The upper cylinder 37 also has an elongated vertically arranged knockout pin 62 suitably fixed to its end plate 57. The pin 62 is held in a fixed vertical position by plate 57 and extends vertically through aligned openings in the piston head 37, member 45, tubular member 54, and die opening 34. The die 33 is moved upwardly and downwardly relative to pin 62 so that with die 33 fully retracted the lower end of such pin extends beneath, i.e., outwardly of the die and for a purpose which will be apparent later.

As previously mentioned, the punch is operated by a lower air cylinder 37 which is similar to the upper air cylinder 37. The lower cylinder has additional components associated therewith which will now be described and designated with new reference numerals. The lower cylinder 37 is suitably fixed to a raised central portion 17A of the worktable 17 in suspended relation therebeneath by a plurality of threaded bolts 63 which extend through openings in central portion 17A and are threaded within cooperating threaded openings in the upper portion of member 39. The central portion 17A is suitably fixed to the main portion of worktable 17 and has a comparatively large central opening 17B therein which allows unobstructed movement of the punch 36 and associated tubular support 54.

The lower cylinder 37 has a shaft or rod 64 fixed to and extending outwardly, i.e., downwardly in this example, from the piston head 47. The rod 64 extends through an opening 65 in the end plate and through a tubular sleeve 66 fixed to the outer surface of end plate 57. An O-ring 67 is also provided in an associated groove in the piston head 47 to prevent leakage of air between the shaft 64 and head 47. The rod 64 has a threaded central portion 68 provided with a threaded nut 69 which may be threadedly adjusted and locked in position by setscrews 70. A pair of guide posts 71 is also provided and suitably fixed to the end plate 57 of the lower cylinder and the guide posts 71 serve to assure rectilinear movement of the telescoping cylindrical member 45 and punch 36 along a vertical axis 72 which is aligned in the required manner with a vertical axis through the die opening 34.

As seen in FIGS. 3 and 6, a guide assembly 73 is provided which operatively associates with the guide posts 71. The guide assembly 73 is comprised of an elongated member 74 which has a substantially semicylindrical surface 75 provided therein. A clamping block 76 is also provided and has a cooperating semicylindrical surface 77. The clamping block 76 is positioned with its surface 77 against a cylindrical lower portion 80 of the rod 64 and a pair of threaded bolts are inserted through openings in the clamping block 76 and through cooperating threaded openings in the member 74 to fix surfaces 75 and 77 of members 74 and 76 respectively against the lower portion 80 of rod 64 whereby such members are held against the rod as a unit. The member 74 also has a pair of openings 81 provided adjacent its opposite ends which are closely toleranced to allow a sliding movement of the assembly 73 along the guide posts 71.

Thus, as air is supplied through air pressure line 60 to the piston head 47 the lower actuator 37 overrides the downward urging of its compression spring 52 and moves the punch 36 upwardly toward the die 33 with assembly 73 guiding the outer end of the rod 64 to assure vertical movement along vertical axis 72 and threaded nut 69 serves as an adjustable stop which strikes sleeve 66 and limits upward movement of the punch 36.

The punch 36 may be fixed to the tubular supporting member 54 of its air cylinder 37 and in this example a suitable transition member 82 is provided. The transition member 82 has one end thereof fixed to its member 54 and its opposite end may provide means for detachably fixing the punch 36 in position, if desired.

The apparatus 15 also has an insert 83 carried by the central portion 17A of worktable 17 and insert 83 has an opening or cutout 83A provided therein which allows the punch 36 and the upper portion of its transition member 82 to move therethrough in an unobstructed manner. The insert 83 may be made of any suitable hard material and may be either loosely supported in position or anchored in position by press fitting or the utilization of suitable fastening devices so that its top surface is arranged coplanar with the top surface of central portion 17A of the worktable 17. The insert 83 serves as a removable part in central portion 17A which may be periodically replaced in the event of excessive wear thereof caused by prolonged use of the apparatus 15.

Reference is now made to FIG. 7 of the drawings which illustrates one exemplary embodiment of a unique control apparatus which may be utilized to control the operation of the air cylinders 37 to assure efficient forming of openings 25 in a printed circuit board modules or laminates 20 and the simultaneous bending of each tab 23 associated with a particular opening 25 transverse its original position. In particular, it will be seen that the control system comprises a pair of electrical lines $L_1$ and $L_2$ which are provided with a main on-off switch 84 which provides electrical power to the entire apparatus 15 and another switch 85 which provides power to a solenoid operated on-off valve 86 which controls the flow of air under regulated high pressure to the apparatus 15 and in particular to the air cylinders 37 in a manner now to be described. A pair of lights 87 and 88 is also provided to indicate when the switches 84 and 85 respectively are on.

The apparatus 15 is provided with air under regulated pressure from any suitable pressure source through an air conduit or line 89 which has the valve 86 installed therein and valve 86 is normally spring urged closed and is actauted open by a solenoid 90. The solenoid 90 is energized by closing switch 85 whereby air under regulated pressure flows through a line 91 to a normally spring closed air valve 93 and simultaneously flows through another line 92 toward work station 31 for a purpose to be explained subsequently.

The apparatus 15 has a foot-operated electrical switch 94 which is operatively connected to a solenoid 95 comprising the solenoid operated valve 93. Upon closing switch 94 the solenoid 95 is energized and opens valve 93 to provide air to the upper air cylinder 37 through a line 96 and simultaneously provide air to another normally spring closed valve 97 through a line 98 connected to valve 93.

The flow of air through valve 93 and line 96 causes the die 33 to be moved vertically downwardly toward the worktable from an upper position 100, illustrated by dotted lines in FIG. 8, toward and against a module or laminate 20 supported on the worktable 17 to firmly clamp the circuit board in position against the worktable 17 as shown by solid lines at 101. Once the die 33 reaches its lowermost or solid line position, there is a back pressure buildup in the line 96 and in a line 102 which is connected to the line 96. The line 102 has an air-electric switch 103 operatively connected therein which is actuated once a predetermined air pressure is reached in the line 102.

Upon actuating the switch 103, it operates to energize a solenoid 104 to open the valve 97 and allow high-pressure air to flow through valve 97 and through a line or conduit portion 105 to the lower air cylinder 37 whereupon with the laminate 20 firmly clamped against the worktable 17 by the die 33 the lower air cylinder 37 automatically moves the punch 36 upwardly in a manner illustrated in FIG. 9. The upward movement of punch 36 causes a portion 107 of substrate 21 arranged beneath an associated tab 23 to be sheared and thereby define an opening 25 in such substrate. Simultaneously with forming or punching of opening 25, the associated tab 23 previously adhered to portion 107 is bent upwardly within the die opening 34 and the sheared portion is also moved upwardly within opening 34.

The punch 36 has a peripheral edge of substantially rectangular outline as shown at 110 in FIG. 5 which is comparatively sharp and assures the shearing of the substrate 21 so that portion 107 is formed as a single piece and the opening 25 is defined free of burrs, jagged edges, or the like.

In addition, the punch 36 has a side edge 111 which is comparatively sharp and after shearing portion 107 the edge 111 scrapes against the inside surface 26 of the tab 23 previously laminated against portion 107 to remove any particles of substrate therefrom and provide a burnishing action which exposes fresh metal of the metallic sheet or layer comprising the tab 23.

The freshly exposed metal defining the inside surface 26 of tab 23 is particularly adapted to have an electrical lead fixed thereagainst such as by welding, brazing, and the like. In addition, it will be appreciated that an associated electrical lead may be extended through an opening 25 and the terminal end thereof connected to the associated tab to thereby define a simple high quality electrical connection while keeping the main portion of such lead along the outside surface of the substrate 21.

Once the punching of a particular hole 25 has been completed the foot switch 94 is opened whereupon the die 33 and punch 36 are retracted by their associated air cylinders 37 to their original positions. As the die 33 is retracted there may be a tendency for the sheared portion 107 to remain lodged in the die opening 34; however, any lodged portion 107 will strike the lower end of the fixed knockout pin 62 to remove it from the die 33. Portion 107 is then forcefully propelled away from the work station 31 by a jet of high velocity air provided by a nozzle 112 which is connected at the terminal end of the line or conduit 92 previously mentioned.

Having described the construction and operation of the components of apparatus 15 in detail, a brief general description will now be made to highlight the simplicity with which such apparatus may be operated to simultaneously punch an opening 25 in a circuit board module 20, bend an associated tab 23 perpendicular to its original position, and burnish the inside surface 26 of each tab. Thus, after actuating electrical switches 84 and 85 a module or laminate 20 is placed on the worktable 17 and precisely positioned manually using the optical positioner 29 so that the center of an associated tab 23 is aligned with the vertical axis 72 which is common to the longitudinal axis of the punch 36. The operator then presses the foot switch 94 which operates to provide pressurized air through solenoid-operated valve 93 to the upper air cylinder 37 which supports and moves the die 33 causing movement of such die vertically downwardly and into clamping engagement firmly against the laminate 20 in the manner illustrated in FIG. 8. Once the die 33 reaches the position of FIG. 8 a back pressure builds up in the line 96 causing operation of the air-electric switch 103 which energizes the solenoid 104 to open valve 97 which is supplied with high pressure air through line 99 to supply air under pressure to the lower air cylinder 37 and thereby move the punch 36 upwardly.

Upward movement of the punch 36 shears a portion 107 from substrate 21 and simultaneously bends the associated tab 23 vertically upwardly within the die opening 34 with the edge 111 of the punch 36 burnishing the inside surface 26 of the tab 23. Once this has taken place the operator opens the foot switch 94 deenergizing the solenoid 95 whereupon high pressure air flowing through valve 93 to both air cylinders 37 is shut off and this allows the springs 52 of such cylinders to retract the die 33 and punch 36 to their original positions. However, air under pressure is continuously supplied through line 92 to the air nozzle 112 so that the sheared portion 107 which drops from within die 33 adjacent the work station 31 is blown away therefrom. After one opening 25 has been defined and the associated tab 23 bent perpendicular its original position the laminate is again positioned in the manner previously described and foot switch 94 again actuated to repeat the cycle until the required number of openings have been formed and their associated tabs bent and burnished.

The moving means for the punch 36 and die 33, i.e., the air cylinders 37, operate in a cooperating manner so that the punch 36 cannot be operated until the die 33 is moved into firm clamping engagement against the laminate 20. Then, the punch 36 moves automatically without further action on the part of an operator whereby the punching of holes 25 and bending of tabs is achieved with optimum efficiency.

In this example of the invention both the die 33 and the punch 36 are relatively movable toward and away from each other. However, it will be appreciated that in some embodiments of this invention it may be preferable to move only one of such components while keeping the other component stationary.

The sheet-like laminate or circuit board module 20 in this example is comprised of a substrate 21 made of an electrical insulating material which has a sheet of an electrical conducting material suitably bonded thereto and the cooperating punch and die are provided to punch an opening in the substrate and simultaneously with the punching of each opening bend an associated tab transverse its original position. However, it is to be understood that the apparatus of this invention may be utilized to bend associated integral tabs of a plain metallic sheet in a direction transverse their original positions. Further, even with the bending of such a plain sheet the punch and die may cooperate to assure the inside surface of each ben tab it suitably burnished.

The actuators 37 for relatively moving the die 33 and punch 36 are shown as air cylinders which are provided with air under regulated pressure from any suitable pressure source. However, it will be appreciated that any suitable actuating means may be provided and comprised of one or more actuators and each actuator may be powered by mechanical, fluid, or electrical means, as desired.

The exemplary apparatus 15 is shown as having a single punch 36 which cooperates with a single die 33 having a die opening 34. However, it will be appreciated that the teachings of this invention may be utilized to provide a punch head having a gang or plurality of punches which may be fixed to an associated plate and attached to an associated actuator so they will be moved together as a unit and such plurality of punches could be operatively associated with a die 33 having a plurality of cooperating die openings corresponding in number to the number of punches whereby a plurality of openings could be simultaneously formed in a laminate or circuit board module 20 while simultaneously bending the corresponding plurality of tabs 23 and burnishing the inside surface of each tab in the manner previously described.

After a particular tab is aligned using the optical positioner 29 and the foot switch 94 is pressed, the apparatus operates in a rapid and substantially automatic manner, and it has been found that a complete operating cycle can be completed in approximately two seconds. Further, it will be appreciated that a given circuit board 20 may have any desired number of openings punched therein and associated tabs bent into position, rather than only the two openings shown in FIG. 2.

The apparatus 15 may also be provided with a suitable counter 113 to count the number of punching operations which have been performed by the apparatus, see FIG. 1. The counter may be either manually or automatically operated by movement of either the punch or die.

The punch 36 comprising the apparatus 15 may be formed in any suitable manner using any suitable known material. However, optimum results have been obtained by forming the punch 36 using standard techniques and forming the die opening 34 in the die 33 using electromachining techniques after roughly cutting an opening in such die whereby close dimensional tolerances may be maintained between the punch and die.

In this example air under pressure is provided through line 92 to the air nozzle 112 in a continuous manner. However, it will be appreciated that, if desired, such air may be provided through the nozzle 112 only after the completion of each operating cycle and air flow may be controlled by a suitable control valve connected in the line 92 and the control valve may be either manually operated or operated by a suitable automatic control system which provides air flow through nozzle 112 for a predetermined time interval after the completion of each punching cycle.

While present exemplary embodiments of this invention, and methods of practicing the same, have been illustrated and described, it will be recognized that this invention may be otherwise variously embodied and practiced within the scope of the following claims.

I claim:

1. An apparatus for providing accessible tabs in a laminate transverse the original position thereof, said apparatus comprising:

- a laminate supporting stand having a bore therethrough;
- first and second air cylinders mounted on opposite sides of the supporting stand, each of said cylinders including
  - a housing having a stepped bore therethrough, the large bore end of the housing being closed,
  - a cylindrical member supported for axial movement within said stepped bore.
  - a piston fixed at one end of said cylindrical member for axial movement in the large bore portion,
  - a spring acting on said piston for biasing said piston and cylindrical member to a retracted position relative to said housing;
- a die carried by the other end of said cylindrical member in said first air cylinder;
- a punch carried by the other end of said cylindrical member in said second air cylinder;
- a common air line connecting a source of air to said first and second cylinders, said air line having separate lines to said first and second cylinders, each of said cylindrical members being actuated for movement toward said supporting stand when air is supplied to said air cylinders to overcome the biasing force of said spring acting on said piston assembly;
- a pressure switch in communication with the line to said first cylinder, said switch being actuated to provide a signal when said die makes contact with a laminate supported by said supporting stand and exerts a minimum clamping force on the laminate wherein back pressure builds up in the line;
- a normally closed switch in said line to said second cylinder preventing air flow to said second cylinder, said switch being connected with said pressure switch and being responsive to the signal from said pressure switch to open said normally closed switch and thereby permitting air flow to said second cylinder only after said die is in contact with said laminate wherein said punch is urged through the supporting stand bore into mating relationship with said die such that the punch is forced through the laminate to shear a portion thereof and bend the adjoining tab; and
- an enabling switch connected in said common air line for connecting the separate lines with the source of air wherein when said enabling switch is engaged air pressure is initially supplied to said first cylinder and to the line connected with said normally closed switch and when said enabling switch is disengaged each of said cylindrical members is urged to the retracted position by the force of the spring acting on the piston.

2. The apparatus as set forth in claim 1 in which said supporting stand has a central portion provided with an easily removable insert which as a cut-out therein for receiving said punch therethrough in an unobstructed manner, said insert being easily replaced in the event of excessive wear therethrough and to accommodate punches of different sizes.

3. The apparatus as set forth in claim 1 further comprising adjustable means for limiting the axial movement of said punch.

4. The apparatus as set forth in claim 3 in which said adjustable means includes a rod fixed to said piston and extending outwardly through the closed end of the housing of said second air cylinder and a nut mounted on said threadable portion wherein the axial movement of said piston and punch is limited by engagement of said nut with said housing.

5. The apparatus as set forth in claim 1 further comprising a stationary knock-out pin mounted in said first cylinder and extending axially therethrough, said pin protruding outwardly beyond said die when said cylindrical member is in the retracted position, said die moving axially relative to said pin wherein said die projects beyond the end of said pin in the operative position whereby the sheared portion of the laminate is urged upward into the die and whereby the sheared portion is forced out of the die when said cylindrical member and die are moved to the retracted position.

6. The apparatus as set forth in claim 5 further comprising means for operating air pressure to the work area for continuously removing the sheared portions from the work area when the sheared portions are forced out of the die during retraction of the die relative to said knock-out pin.

References Cited

UNITED STATES PATENTS

| | | | |
|---|---|---|---|
| 445,603 | 2/1891 | Turner | 72—325 |
| 866,024 | 9/1907 | Hansen | 72—325 |
| 1,527,266 | 2/1925 | Nathanson et al. | 72—327 |
| 2,493,933 | 1/1950 | Thompson | 72—325 |
| 3,372,474 | 3/1968 | Polley et al. | 113—119 |
| 3,375,576 | 4/1968 | Klein et al. | 113—119 |
| 3,514,988 | 6/1970 | Klein et al. | 113—119 |

CHARLES W. LANHAM, Primary Examiner

E. M. COMBS, Assistant Examiner

U.S. Cl. X.R.

72—23, 326; 113—119